(12) United States Patent
Ito et al.

(10) Patent No.: US 7,979,873 B2
(45) Date of Patent: Jul. 12, 2011

(54) CHUCKING DEVICE FOR REMOVABLY HOLDING A DISK WITH A CENTRAL OPENING, BRUSHLESS MOTOR WITH THE CHUCKING DEVICE AND DISK DRIVE APPARATUS WITH THE BRUSHLESS MOTOR

(75) Inventors: Haruhiko Ito, Kyoto (JP); Toshihide Sonoda, Kyoto (JP); Takuya Yamane, Kyoto (JP); Shigeo Kawamura, Kyoto (JP); Yoshihisa Kitamura, Kyoto (JP); Hisakazu Motomochi, Kyoto (JP)

(73) Assignee: Nidec Corporation, Kyoto (JP)

( * ) Notice: Subject to any disclaimer, the term of this patent is extended or adjusted under 35 U.S.C. 154(b) by 512 days.

(21) Appl. No.: 12/201,638

(22) Filed: Aug. 29, 2008

(65) Prior Publication Data

US 2009/0064212 A1    Mar. 5, 2009

(30) Foreign Application Priority Data

Aug. 31, 2007  (JP) ................................. 2007-225196

(51) Int. Cl.
*G11B 17/028*    (2006.01)
(52) U.S. Cl. ....................................................... 720/707
(58) Field of Classification Search .......... 720/703–704, 720/706–707
See application file for complete search history.

(56) References Cited

U.S. PATENT DOCUMENTS

| | | | | |
|---|---|---|---|---|
| 5,166,920 A * | 11/1992 | Kogure | .......................... | 720/707 |
| 5,774,445 A * | 6/1998 | Sawi et al. | .................... | 720/707 |
| 6,208,613 B1 * | 3/2001 | Iizuka | ............................ | 720/707 |
| 6,347,070 B1 * | 2/2002 | Fahey et al. | .................... | 720/706 |
| 6,363,048 B1 * | 3/2002 | Wu et al. | ........................ | 720/707 |
| 6,611,490 B1 * | 8/2003 | Bierhoff | ........................ | 720/707 |
| 6,826,771 B1 * | 11/2004 | Wada | ............................ | 720/707 |
| 7,036,135 B2 * | 4/2006 | Hsu et al. | ....................... | 720/707 |
| 7,181,752 B2 * | 2/2007 | Shinkai et al. | ................ | 720/707 |
| 7,802,272 B2 * | 9/2010 | Kanzawa et al. | .............. | 720/707 |
| 2004/0216154 A1 * | 10/2004 | Kim et al. | ..................... | 720/707 |
| 2007/0028255 A1 | 2/2007 | Ito et al. | | |
| 2007/0143773 A1 * | 6/2007 | Park et al. | ..................... | 720/706 |
| 2007/0294712 A1 * | 12/2007 | Ito et al. | ........................ | 720/702 |

FOREIGN PATENT DOCUMENTS

| | | |
|---|---|---|
| JP | 09-035383 A | 2/1997 |
| JP | 2002-148134 A | 5/2002 |
| JP | 2003-036584 A | 2/2003 |
| JP | 2003-217201 A | 7/2003 |
| JP | 2004-234773 A | 8/2004 |

* cited by examiner

*Primary Examiner* — Brian Miller
(74) *Attorney, Agent, or Firm* — Westerman, Hattori, Daniels & Adrian, LLP

(57) ABSTRACT

A chucking device for removably holding a disk with a central opening, includes a shaft coaxially arranged with a specified center axis; a turntable fixed to the shaft, the turntable having a disk support surface for supporting the disk; and a resin-made cone arranged axially above the turntable, the cone including a shaft-fixed portion fixed to the shaft, a disk holding portion having an annular disk holding surface inclined radially outwardly and axially downwardly, and an arm portion for radially interconnecting the shaft-fixed portion and the disk holding portion. Herein, the arm portion includes a support portion extending radially outwardly from the shaft-fixed portion and an elastically deformable portion joined to the support portion for being elastically deformed to axially downwardly move the disk holding portion as the disk comes into contact with the disk holding portion.

22 Claims, 11 Drawing Sheets

CHUCKING DEVICE FOR REMOVABLY HOLDING A DISK WITH A CENTRAL OPENING, BRUSHLESS MOTOR WITH THE CHUCKING DEVICE AND DISK DRIVE APPARATUS WITH THE BRUSHLESS MOTOR

FIELD OF THE INVENTION

The present invention relates to a chucking device for removably holding a disk, a brushless motor provided with the chucking device and a disk drive apparatus equipped with the brushless motor. More particularly, the present invention pertains to a chucking device capable of accurately aligning the center of a central opening of a disk with the center of the chucking device.

BACKGROUND OF THE INVENTION

In recent years, the rotational speed of a disk and a brushless motor for rotating the disk is increased as the operation of recording and reproducing the disk such as a CD, a DVD or the like becomes faster. At the present time, it is sometimes the case that the brushless motor is rotated at a speed of about 12,000 rpm. As a chucking device that copes with the high speed rotation of the disk, there has been employed a structure that includes a cone having an annular slanting surface for making contact with the entire extension of an inner circumferential surface of a central opening of the disk. The cone is movable along the axis of a shaft serving as a rotating shaft. Furthermore, the cone is axially upwardly biased by a resilient member such as a coil spring or the like (see, e.g., Patent Document 1 for the structure of such a conventional chucking device).

(Patent Document 1) Japanese Patent Application Publication No. 2004-234773

As a disk drive apparatus becomes cheaper, there is an increasing demand for price reduction of the brushless motor with which the disk drive apparatus is equipped.

However, the conventional chucking device with the cone requires the use of an additional clamp member that presses the upper surface of the disk to keep the same in place. In addition, a resilient member such as a coil spring or the like is required in the conventional chucking device, which increases the number of parts of the chucking device. As a result, it becomes difficult to reduce the price of the chucking device, which in turn makes it difficult to achieve price reduction of the brushless motor provided with the chucking device.

SUMMARY OF THE INVENTION

In view of the above, the present invention is to reduce the number of parts of a chucking device with a cone, thereby achieving price reduction of the chucking device.

In accordance with one aspect of the present invention, there is provided a chucking device for removably holding a disk with a central opening. The chucking device includes a shaft coaxially arranged with a specified center axis; a turntable fixed to the shaft, the turntable having a disk support surface for supporting the disk; and a resin-made cone arranged axially above the turntable, the cone including a shaft-fixed portion fixed to the shaft, a disk holding portion having an annular disk holding surface inclined radially outwardly and axially downwardly, and an arm portion for radially interconnecting the shaft-fixed portion and the disk holding portion.

Herein, the arm portion includes a support portion extending radially outwardly from the shaft-fixed portion and an elastically deformable portion joined to the support portion for being elastically deformed to axially downwardly move the disk holding portion as the disk comes into contact with the disk holding portion.

With this configuration, it is possible to axially downwardly move the annular disk holding portion with a small force, because the arm portion has the elastically deformable portion formed radially outwardly of the support portion. In other words, it becomes possible to reduce the disk mounting force. Therefore, it is possible to provide a chucking device operable with a reduced disk mounting force.

It is preferable that the disk holding portion includes an arcuate peripheral wall portion substantially parallel to the center axis and an arcuate planar portion extending radially inwardly from a lower end of the peripheral wall portion, the peripheral wall portion and the planar portion being in a position circumferentially deviated from the arm portion, and the turntable includes an inner wall portion having an outer circumferential surface radially facing toward an inner circumferential surface of the planar portion, the inner circumferential surface of the planar portion being slidingly movable with respect to the outer circumferential surface of the inner wall portion.

With this configuration, it is possible to prevent the disk holding portion from tilting during its axial movement, because the inner circumferential surface of the planar portion makes sliding movement with the outer circumferential surface of the inner wall portion. Therefore, it is possible to provide a chucking device capable of reliably bringing the center of the central opening of the disk into alignment with the center of the cone.

Further, it is preferable that the inner circumferential surface of the planar portion has surface roughness smaller than that of the remaining portions of the cone.

With this configuration, it is possible to reduce the frictional force generated when the turntable makes sliding movement with the inner circumferential surface of the planar portion, because the surface roughness of the inner circumferential surface of the planar portion that affects the sliding movement is smaller than that of the remaining portions of the cone. Therefore, it is possible to reduce the disk mounting force.

Further, it is preferable that a cone gate portion serving as a resin injection port during an injection molding process is arranged on an upper surface or a lower surface of the planar portion.

With this configuration, it is possible to prevent the cone gate portion from impeding movement of the disk along the cone, because the cone gate portion is formed on the upper surface or the lower surface of the planar portion of the cone that does not make contact with the disk. Therefore, it is possible to provide a chucking device operable with a reduced disk mounting force.

Further, it is preferable that the arm portion is thinner than the remaining portions of the cone.

With this configuration, it is easy to cause elastic deformation to the cone, because the arm portion is thinner than the remaining portions of the cone.

Further, it is preferable that the elastically deformable portion includes a first deformation portion extending axially downwardly from the support portion; a second deformation portion extending substantially parallel to the first deformation portion and joining to the disk holding portion; and a third deformation portion for interconnecting the first deformation portion and the second deformation portion.

In the above chucking device, it is preferable that the first deformation portion is thicker than the second deformation portion.

In the above chucking device, it is preferable that the second deformation portion has an outer surface joined to the disk holding portion in a position axially above the position where the disk holding portion is joined to an outer circumferential surface of a peripheral wall portion.

With the above configurations, it is possible to have the second deformation portion elastically deformed with increased efficiency, because the first deformation portion is thicker than the second deformation portion. Particularly, since the elastically deformable portion has a generally U-like shape, it is possible to increase the axial length of the second deformation portion. This makes it possible to elastically deform the second deformation portion in a radial inward direction with a small force.

Moreover, it is possible to increase the length of the second deformation portion, because the second deformation portion has an outer surface joined to the disk holding portion in a position axially above the position where the disk holding portion is joined to an outer circumferential surface of the peripheral wall portion. This allows the second deformation portion to be elastically deformed over an increased extent. As a result, it is possible to reduce the disk mounting force.

It is preferable that a radial distance between the center axis and the inner surface of the second deformation portion is substantially the same as the radial distance between the center axis and the inner circumferential surface of the peripheral wall portion, and a radial distance between the center axis and the outer surface of the second deformation portion is smaller than the radial distance between the center axis and the outer circumferential surface of the peripheral wall portion.

With this configuration, the mold for molding the cone can be fabricated by using a simple structure of upper and lower molds.

Further, it is preferable that the support portion extends radially outwardly from an upper end of an outer circumferential surface of the shaft-fixed portion.

With this configuration, it is possible to further increase the axial length of the second deformation portion of the elastically deformable portion that has a generally U-like shape in the radial direction, because the support portion extends radially outwardly from the upper end of the outer circumferential surface of the shaft-fixed portion. This allows the second deformation portion to be elastically deformed with a smaller force. Therefore, it is possible to provide a chucking device operable with a reduced disk mounting force.

Further, it is preferable that a rib for interconnecting the outer circumferential surface of the peripheral wall portion and the disk holding surface is formed between the outer circumferential surface of the peripheral wall portion and the disk holding surface.

In this configuration, the presence of the rib makes it possible to prevent the disk holding portion from being deformed radially inwardly. Therefore, it is possible to provide a chucking device free from a bad influence exercised by deformation of the cone and capable of bringing the center of the central opening of the disk into good alignment with the center of the cone.

Further, it is preferable that the rib includes a plurality of ribs formed on the outer circumferential surface of the peripheral wall portion to be circumferentially spaced apart with one another.

With this configuration, it is possible to reduce occurrence of molding defects such as sink marks, voids and the like, because the ribs are formed to be plural in number and spaced apart circumferentially with one another.

Further, it is preferable that the inner wall portion of the turntable is formed in a cylindrical shape and has an inner circumferential surface fixed to the shaft.

With this configuration, it is possible to simplify the shape of the turntable, because the inner wall portion of the turntable serves as the shaft-fixed portion.

Further, it is preferable that the chucking device further includes a yoke made of a magnetic body and arranged axially above the shaft-fixed portion of the cone, the yoke including a cylinder portion with an inner circumferential surface fixed to the shaft, and a generally annular planar portion extending radially outwardly from the cylinder portion, wherein the shaft-fixed portion of the cone is arranged axially above the inner wall portion of the turntable, and a gap is formed between an upper surface of the inner wall portion and a lower surface of the shaft-fixed portion, a gap being formed between an upper surface of the shaft-fixed portion and a lower surface of the cylinder portion of the yoke.

With this configuration, it is possible to mount the cone, the turntable and the yoke with increased accuracy, because they can be mounted with reference to the shaft.

Further, it is preferable that the inner wall portion of the turntable has an outer diameter greater than that of the shaft-fixed portion of the cone and wherein a protrusion extending axially above the lower surface of the shaft-fixed portion is formed in an upper surface region of the inner wall portion lying radially outwardly of the shaft-fixed portion, an outer peripheral surface of the protrusion is formed as a part of the outer circumferential surface of the inner wall portion.

With this configuration, it is possible to reduce the thickness of the chucking device and also to secure the sliding movement portion, because the protrusion is formed in the region of the inner wall portion lying radially outwardly of the shaft-fixed portion.

Further, it is preferable that the support portion extends radially outwardly from the upper end of the outer circumferential surface of the shaft-fixed portion, wherein the support portion has an upper surface whose axial height is substantially the same as that of the upper surface of the shaft-fixed portion, and a curved surface portion is formed on a lower surface of the support portion in such a manner as to increase the axial thickness of the support portion in a radially inward direction.

In this configuration, the presence of the curved surface portion makes it possible to avoid concentration of a stress on the support portion. It is also possible to ensure that the support portion is elastically deformed in the axial downward direction with ease, because the support portion extends radially outwardly from the upper end of the shaft-fixed portion.

Further, it is preferable that the turntable is formed of injection-molded resin material, wherein the turntable includes a cylinder portion having an inner circumferential surface fixed to the shaft, the cylinder portion including the inner wall portion, and a radial extension portion of annular plane shape extended from a lower end of the inner wall portion to axially face the planar portion of the cone, and a turntable gate portion serving as an injection port of the resin material during the injection molding process is arranged on an upper surface of the cylinder portion.

With this configuration, it is possible to form the turntable gate portion with no likelihood of contact with the planar portion, because the turntable gate portion is formed on the upper surface of the radial extension portion with a gap left between the planar portion and the radial extension portion.

Further, it is preferable that a protrusion forming a part of the inner wall portion and having an upper surface positioned axially above a radially inner surface region of the cylinder portion is formed on an outer peripheral region of the cylinder portion, wherein the protrusion includes a plurality of protrusions arranged to be circumferentially spaced apart with one another, and the turntable gate portion is provided between the protrusions neighboring in a circumferential direction.

With this configuration, it is possible to improve the flowability of a resin material during molding, because the turntable gate portion is provided in the cylinder portion, i.e., the central portion of the turntable. This makes it possible to enhance the moldability of the turntable to prevent molding defects. Moreover, it is possible to avoid reduction in the axial length of the inner circumferential surface of the cylinder portion fixed to the shaft, because the turntable gate portion is formed in the outer marginal region of the cylinder portion. Therefore, it is possible to prevent reduction in the fixing strength of the turntable relative to the shaft.

In addition, it is possible to reduce the area over which the cylinder portion makes contact with the cone, because the protrusions are arranged to be spaced apart circumferentially with one another and because the gate portion is formed circumferentially between the protrusions. Use of this structure makes it possible to reduce the frictional force generated when the cone is slid, thereby reducing the sliding force of the cone.

Further, it is preferable that the turntable gate portion is formed to extend radially outwardly beyond the outer circumferential surface of the shaft-fixed portion of the cone, and wherein the turntable gate portion has an injection portion corresponding to a resin injection port of a mold, the injection portion being positioned radially outwardly of the shaft-fixed portion of the cone.

With this configuration, it is possible to prevent the shaft-fixed portion from making contact with the upward protrusion corresponding to the residual resin material, which is formed in the injection portion when the turntable as a molded product is separated from the mold. This is because the injection portion of the turntable gate portion is formed radially outwardly of the outer circumferential surface of the shaft-fixed portion. Therefore, it is possible to reduce the axial gap between the shaft-fixed portion and the cylinder portion of the turntable. This makes it possible to provide a thin chucking device.

Further, it is preferable that the elastically deformable portion is formed radially outwardly of the outer circumferential surface of the inner wall portion and has a portion lying axially below the upper surface of the inner wall portion.

With this configuration, it is possible to assure reduction in the thickness of the chucking device, because the elastically deformable portion has a portion lying axially below the upper surface of the inner wall portion.

In accordance with another aspect of the present invention, there is provided a brushless motor provided with the chucking device of the above. The brushless motor includes a rotating part having a rotor magnet rotatable about the center axis together with the shaft; and a fixed part having a stator facing toward the rotor magnet for generating magnetic fields.

With this configuration, it is possible to provide a brushless motor capable of reducing the disk mounting force and bringing the center of the central opening of the disk into good alignment with the center of the cone.

In accordance with still another aspect of the present invention, there is provided a disk drive apparatus equipped with the brushless motor of the above. The disk drive apparatus includes an optical pickup mechanism having a recording and reproducing unit for performing at least one of optical recording and reproducing tasks for a disk; and a moving mechanism for moving the optical pickup mechanism in a radial direction of the disk.

With this configuration, it is possible to provide a disk drive apparatus capable of reducing the disk mounting force and bringing the center of the central opening of the disk into good alignment with the center of the cone.

In accordance with the present invention, it is possible to reduce the number of parts of a cone type chucking device, thereby achieving price reduction of the chucking device.

BRIEF DESCRIPTION OF THE DRAWINGS

The above features of the present invention will become apparent from the following description of preferred embodiments given in conjunction with the accompanying drawings, in which.

DETAILED DESCRIPTION OF THE PREFERRED EMBODIMENTS

Overall Structure of Brushless Motor

An embodiment of a brushless motor in accordance with the present invention will now be described with reference to FIG. 1, which is an axially-cut schematic section view showing the embodiment of the present brushless motor.

Figure 1:
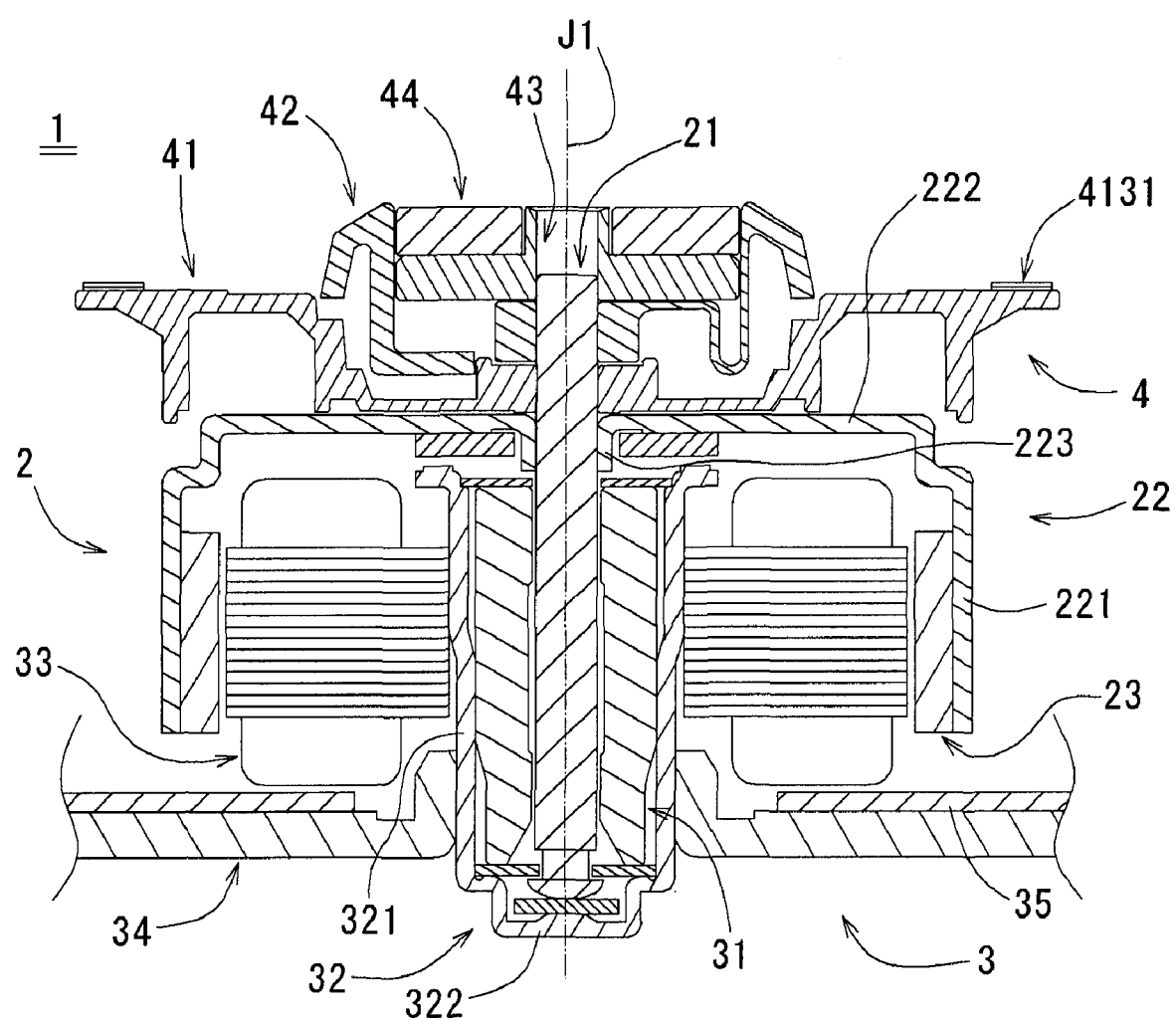
FIG. 1 is an axially-cut schematic section view showing one embodiment of a brushless motor in accordance with the present invention.

Referring to FIG. 1, a brushless motor 1 includes a motor unit, which has a rotating part 2 rotatingly driven about a specified center axis J1; a fixed part 3 for rotatably supporting the rotating part 2; and a chucking device 4 arranged axially above the rotating part 2.

First, description will be made on the rotating part 2.

The rotating part 2 includes a generally cylindrical shaft 21 arranged in a coaxial relationship with the center axis J1; a rotor holder 22 fixed to the shaft 21 for rotation about the center axis J1; and an annular rotor magnet 23 fixedly secured to the rotor holder 22.

The rotor holder 22 is formed of an outer cylinder portion 221 having an inner circumferential surface to which an outer circumferential surface of the rotor magnet 23 is fixed; a planar cover portion 222 extending from the outer cylinder portion 221 toward the center axis J1; and an inner cylinder portion 223 having an inner circumferential surface fixed to an outer circumferential surface of the shaft 21.

Next, description will be given on the fixed part 3.

The fixed part 3 includes a generally cylindrical, sintered material-made sleeve 31 having an inner circumferential surface for radially supporting the shaft 21 in a rotatable manner; a housing 32 having a cylinder portion 321 with an inner circumferential surface for holding an outer circumferential surface of the sleeve 31 and a bottom portion 322 for covering a lower extension of the cylinder portion 321; a stator 33 having an inner circumferential surface fixed to an outer circumferential surface of the cylinder portion 321 of the housing 32 and an outer circumferential surface radially facing toward an inner circumferential surface of the rotor magnet 23; a generally flat attachment plate 34 arranged axially below the stator 33, the attachment plate 34 having an inner circumferential surface fixed to an outer circumferential surface of the cylinder portion 321 of the housing 32; and a circuit board 35 arranged on an upper surface of the attachment plate 34.

The stator 33 is designed to generate magnetic fields as an electric current is supplied to the stator 33 from an external power supply not shown in the drawings. The rotating part 2 is imparted a rotational driving force about the center axis J1 by the magnetic interaction between the magnetic fields and the rotor magnet 23.

(Structure of Chucking Device)

Figure 2:
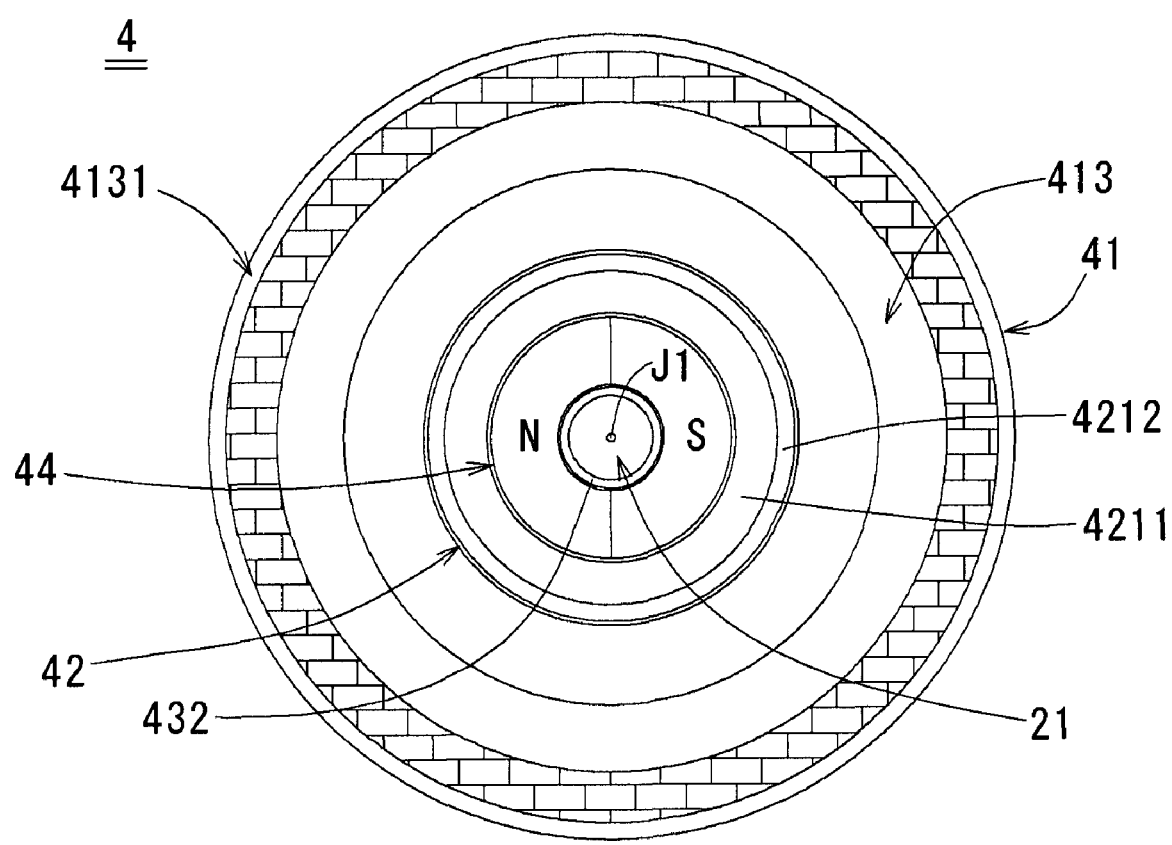
FIG. 2 is a schematic top plan view showing one embodiment of a chucking device in accordance with the present invention.

Next, the chucking device 4 of the present invention will be described with reference to FIGS. 1 through 9. FIG. 2 is a top plan view showing the present chucking device 4.

Referring to FIGS. 1 and 2 (or FIG. 8), the chucking device 4 includes a turntable 41, formed of injection-molded resin material, arranged on an upper surface of the cover portion 222 of the rotor holder 22 and fixed to the shaft 21; a cone 42 arranged axially above the turntable 41, the cone 42 having a disk holding portion 421 for making contact with a central opening of a disk not shown in the drawings, the cone 42 formed of injection-molded resin material; a yoke 43, formed of a magnetic body, arranged axially above the cone 42 and fixed to the shaft 21; and a generally annular clamp magnet 44 fixed to an upper surface of the yoke 43.

An annular disk support portion 4131 made of rubber or the like is formed on the turntable 41 radially outwardly of the cone 42. The disk support portion 4131 has an upper surface that makes contact with a lower surface of a disk. Thus, the upper surface of the disk support portion 4131 serves as a support surface on which the disk is mounted to the chucking device 4. Herein, the clamp magnet 44 of the present embodiment is magnetized with two poles in a circumferential direction.

Figure 3:
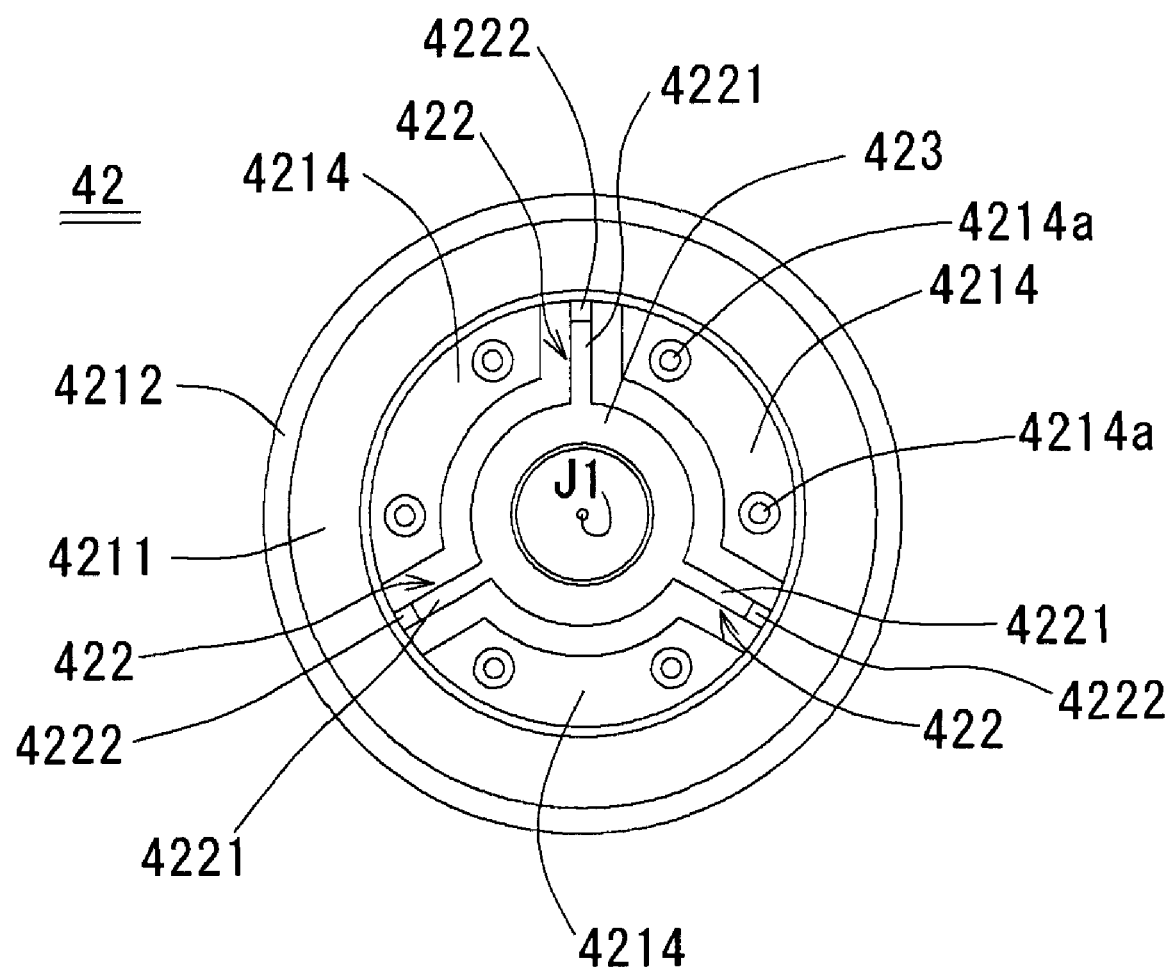
FIG. 3 is a schematic top plan view illustrating a cone that forms a part of the present chucking device.
Figure 4:
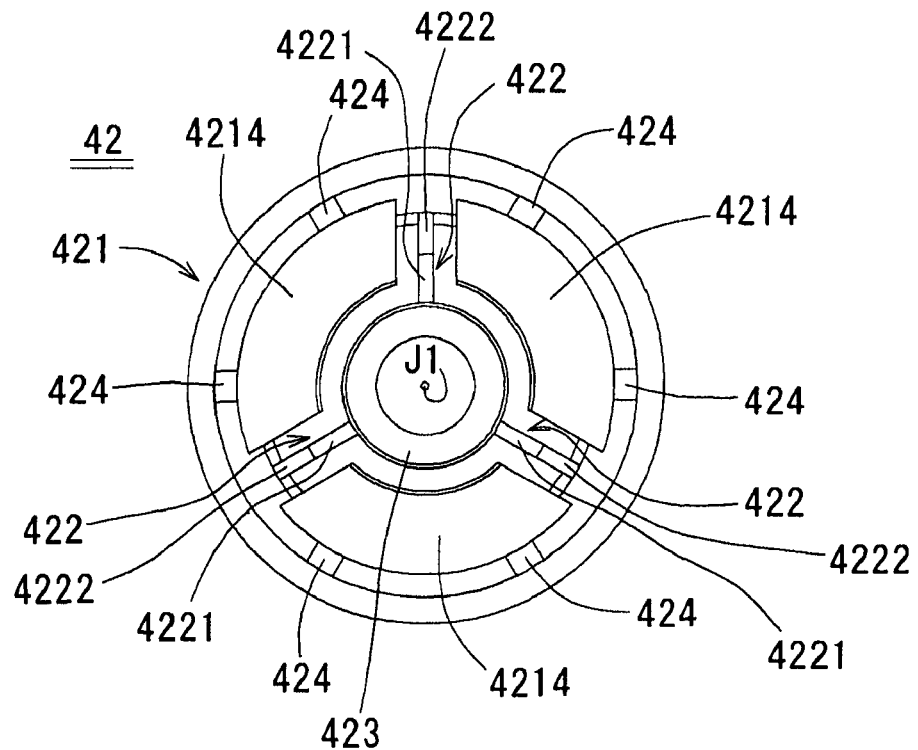
FIG. 4 is a schematic bottom plan view illustrating the cone that forms a part of the present chucking device.
Figure 5:
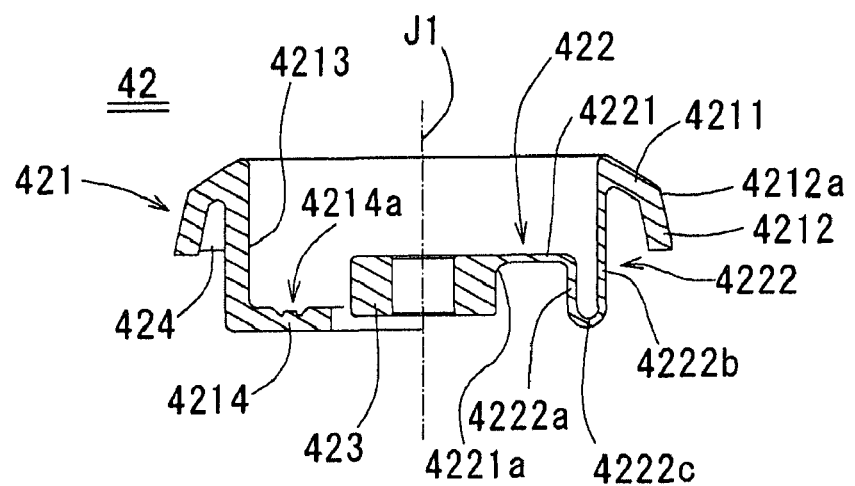
FIG. 5 is an axially-cut schematic section view illustrating the cone that forms a part of the present chucking device.

Referring to FIGS. 3 through 5, the cone 42 includes an annular disk holding portion 421 having a disk holding surface 4212a for making contact with the central opening of the disk; a plurality of arm portions 422 each extending radially inwardly from the disk holding portion 421; and a generally cylindrical shaft-fixed portion 423 having an inner circumferential surface fixed to the outer circumferential surface of the shaft 21. In the present embodiment, the arm portions 422 include three arm portions arranged at a substantially equal interval, i.e., 120 degrees.

The disk holding portion 421 includes a first slanting portion 4211 inclined radially outwardly and axially downwardly; and a second slanting portion 4212 formed radially outwardly of the first slanting portion 4211 and inclined radially outwardly and axially downwardly. The center axis J1 and the first slanting portion 4211 make an acute angle which is greater than that made between the center axis J1 and the second slanting portion 4212.

The first slanting portion 4211 has an outer surface that makes contact with the lower edge of the central opening of the disk when the disk is being mounted to the chucking device 4. Then, the lower edge of the central opening of the disk is guided to the second slanting portion 4212 by the first slanting portion 4211.

The disk holding surface 4212a, which is the outer surface of the second slanting portion 4212, makes contact with the lower region of the inner circumferential surface of the central opening of the disk when the disk has been mounted to the chucking device 4. The disk holding surface 4212a holds the disk in place in a radial direction and supports the disk in an axial direction.

Each of the arm portions 422 includes a support portion 4221 extending radially outwardly from the shaft-fixed portion 423 and an elastically deformable portion 4222 continuously extending from the support portion 4221 and joining to the disk holding portion 421.

The support portion 4221 is connected to the upper end portion of the outer circumferential surface of the shaft-fixed portion 423. Furthermore, the support portion 4221 extends perpendicularly to the center axis J1. The axial position of an upper surface of the support portion 4221 is substantially flush with the axial position of an upper surface of the shaft-fixed portion 423. The lower surface of the support portion 4221 has a curved surface region 4221a whose axial width is increased axially downwardly toward the shaft-fixed portion 423 (namely, in a radial inward direction). The presence of the curved surface region 4221a makes it possible to increase the cross-sectional area of the support portion 4221 in the radial inward direction. Therefore, it is possible to improve the flowability of a resin material during the injection-molding process of the cone 42. As a result, it becomes possible to reduce occurrence of molding defects in the injection-molding process of the cone 42.

The elastically deformable portion 4222 is connected to the support portion 4221 and is formed into a generally U-like shape. The elastically deformable portion 4222 includes a first deformation portion 4222a extending axially downwardly from the support portion 4221; a second deformation portion 4222b provided closer to the disk away from the first deformation portion 4222a, i.e., radially outwardly of the first deformation portion 4222a, and connected to the disk holding portion 421; and a third deformation portion 4222c for interconnecting the first deformation portion 4222a and the second deformation portion 4222b.

The first deformation portion 4222a, the second deformation portion 4222b and the third deformation portion 4222c are formed to have the same circumferential width. The first deformation portion 4222a has a radial thickness greater than that of the second deformation portion 4222b. In the present embodiment, the radial thickness of the first deformation portion 4222a is equal to about 0.5 mm and the radial thickness of the second deformation portion 4222b is equal to about 0.4 mm.

Owing to the fact that the second deformation portion 4222b is radially thicker than the first deformation portion 4222a, it is possible to ensure that the cross-sectional area of the second deformation portion 4222b taken perpendicularly to the center axis J1 becomes greater the cross-sectional area of the first deformation portion 4222a taken perpendicularly to the center axis J1. Therefore, it is possible to improve the flowability of a resin material during the injection-molding process of the cone 42. As a result, it becomes possible to reduce occurrence of molding defects in the injection-molding process of the cone 42.

In those positions of the disk holding portion 421 circumferentially deviated from the arm portions 422, there are provided a plurality of arcuate peripheral wall portions 4213 each extending axially downwardly from the radial inner end of the first slanting portion 4211; and a plurality of planar portions 4214 each extending radially inwardly from the lower ends of the peripheral wall portions 4213. The peripheral wall portions 4213 and the planar portions 4214 are respectively formed between the circumferentially neighboring arm portions 422 (the number of these portions are three in the present embodiment).

The planar portions 4214 are formed into a fan shape so that the circumferential width thereof can be decreased radially inwardly. The circumferential side surfaces of each of the planar portions 4214 faces circumferentially with the circumferential side surfaces of each support portion 4221 of the arm portions 422. Furthermore, the circumferential side surfaces of each of the planar portions 4214 are formed substantially parallel to the circumferential side surfaces of each support portion 4221 of the arm portions 422.

In the present embodiment, each of the peripheral wall portions 4213 has a radial thickness of about 0.9 mm and each of the planar portions 4214 has an axial thickness of about 1.0 mm. On the upper surface of the planar portions 4214, there is formed a gate portion 4214a used as an inlet port of a mold (not shown) through which a resin material flows in the molding process. The gate portion 4214a is formed in each of the three planar portions 4214. An ejector pin (not shown) for separating the cone 42 from the mold comes into contact with the lower surface of each of the planar portions 4214. The cone 42 as a molded product is separated apart from the mold by means of the ejector pin.

Although the gate portion 4214a is provided on the upper surface of each of the planar portions 4214 and the ejector pin is brought into contact with the lower surface of each of the planar portions 4214 in the present embodiment, it may be possible to form the gate portion 4214a on the lower surface of each of the planar portions 4214, while allowing the ejector pin to make contact with the upper surface of each of the planar portions 4214. By forming the gate portion 4214a in each of the planar portions 4214 which is thicker than the remaining portions of the cone 42, it becomes possible to secure the strength required for cutting away the gate portion 4214a from the cone 42 as a molded product in the mold separation process.

Further, since each of the planar portions 4214 has an increased axial thickness, it is possible to increase the area over which the inner circumferential surfaces of the planar portions 4214 make sliding movement with the outer circumferential surface of a cylinder portion 411 of the turntable 41. As a result, it is possible to prevent radial deformation of the disk holding surface 4212a of the cone 42, which would otherwise occur during axial downward movement of the cone 42. Consequently, it is possible to enhance the centering accuracy of the disk relative to the center axis J1 when the disk is mounted to the chucking device 4.

Additional gate portions 423a are formed on the lower surface of the shaft-fixed portion 423 of the cone 42. In the present embodiment, three gate portions 423a are formed on the lower surface of the shaft-fixed portion 423 to be circumferentially spaced apart with one another. Since the gate portions 423a are provided in the central portion of the cone 42, it is possible to improve the flowability of a resin material when injection-molding the cone 42. Therefore, it is possible to reduce molding defects of the cone 42. Since the axial thickness of the shaft-fixed portion 423 is greater than that of the remaining portions of the cone 42, it is possible to secure the strength required in cutting away the gate portion 423a from the cone 42 as a molded product in the mold separation process.

The inner circumferential surfaces of the planar portions 4214 are formed to have surface roughness smaller than that of the remaining portions of the cone 42. Similarly, the portion of the outer circumferential surface of the cylinder portion 411 that makes sliding movement with the inner circumferential surfaces of the planar portions 4214 is formed to have surface roughness smaller than that of the remaining portions of the turntable 41. In the present embodiment, the surface roughness Ry of the inner circumferential surface of the planar portions 4214 is set equal to about 1.0 μm or less. In this regard, the Ry is defined in Japanese Industrial Standard (JIS) and refers to a value found by summing up the height from a mean line to a highest ridge peak and the depth from the mean line to a lowest valley bottom, wherein the mean line denotes a mean line of standard length taken from a roughness curve obtained by measurement.

Use of this structure makes it possible to reduce the frictional force when the inner circumferential surfaces of the planar portions 4214 make sliding movement with the outer circumferential surface of the cylinder portion 411. Therefore, it is possible to reduce the force (disk mounting force) required in mounting the disk to the chucking device 4.

The radial distance between the radially outer surface of the second deformation portion 4222b of the elastically deformable portion 4222 and the center axis J1 is smaller than the radial distance between the outer circumferential surface of each of the peripheral wall portions 4213 and the center axis J1. The radial distance between the radially inner surface of the second deformation portion 4222b and the center axis J1 is nearly the same as the radial distance between the inner circumferential surface of each of the peripheral wall portions 4213 and the center axis J1. Therefore, when injection-molding the cone 42, the mold for performing the injection-molding to form the cone 42 can be constructed from two molds, i.e., upper and lower molds. This makes it possible to simplify the mold in construction.

The axial position in which the radially outer surface of the second deformation portion 4222b is joined to the lower surface of the first slanting portion 4211 of the disk holding portion 421 lies axially above the axial position in which the lower surface of the first slanting portion 4211 of the disk holding portion 421 is joined to the outer circumferential surface of each of the peripheral wall portions 4213. This makes it possible to increase the axial length of the second deformation portion 4222b, thereby allowing the second deformation portion 4222b to be elastically deformed with a small force. As a consequence, it becomes possible to reduce the disk mounting force.

Ribs 424 for interconnecting the peripheral wall portions 4213 and the first and second slanting portions 4211 and 4212 are formed in a radial gap between the outer circumferential surfaces of the peripheral wall portions 4213 and the first and second slanting portions 4211 and 4212 of the disk holding portion 421. The ribs 424 are formed two-by-two on each of the peripheral wall portions 4213 to be circumferentially spaced apart with each other. In the present embodiment, the interval between two neighboring ribs 424 is set equal to about 60 degrees.

Figure 6A:
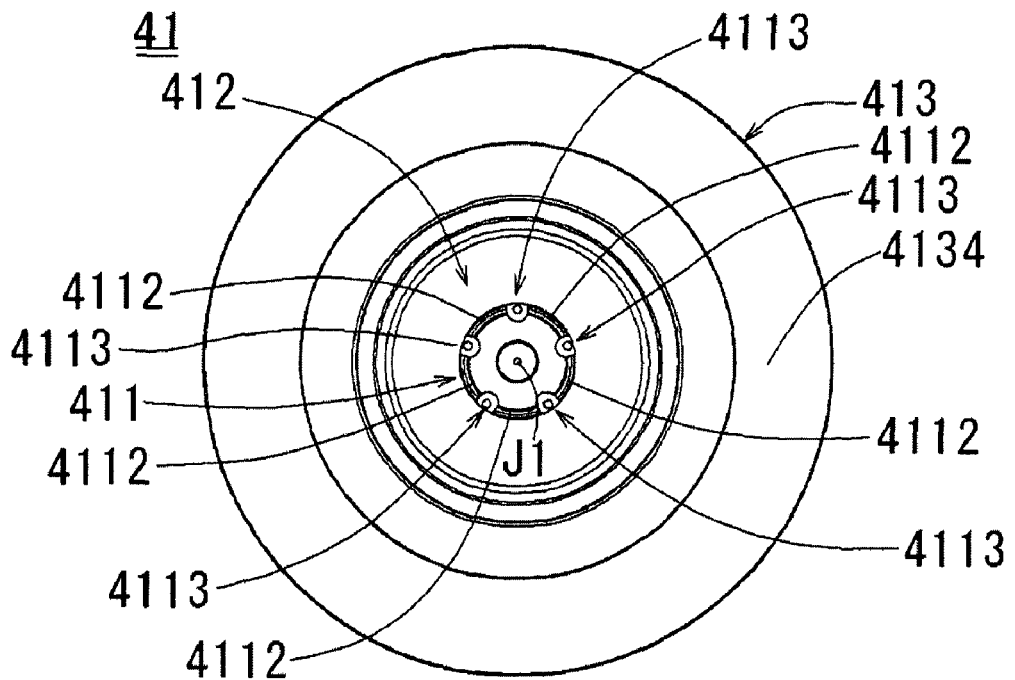
FIG. 6A is a top plan view showing a turntable that forms a part of the present chucking device.
Figure 6B:
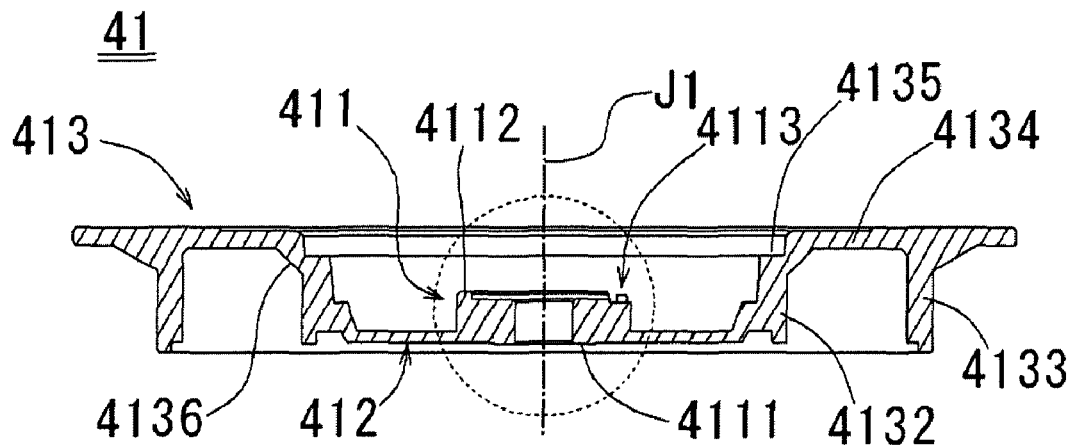
FIG. 6B is an axially-cut schematic section view thereof.

Referring to FIGS. 6A and 6B, the turntable 41 includes a cylinder portion 411 of generally cylindrical shape having an inner circumferential surface fixed to the outer circumferential surface of the shaft 21, a generally planar radial extension portion 412 extending radially outwardly from an axial lower end of the cylinder portion 411, and a disk support part 413 formed radially outwardly of the radial extension portion 412 for supporting the disk.

Figure 7A:
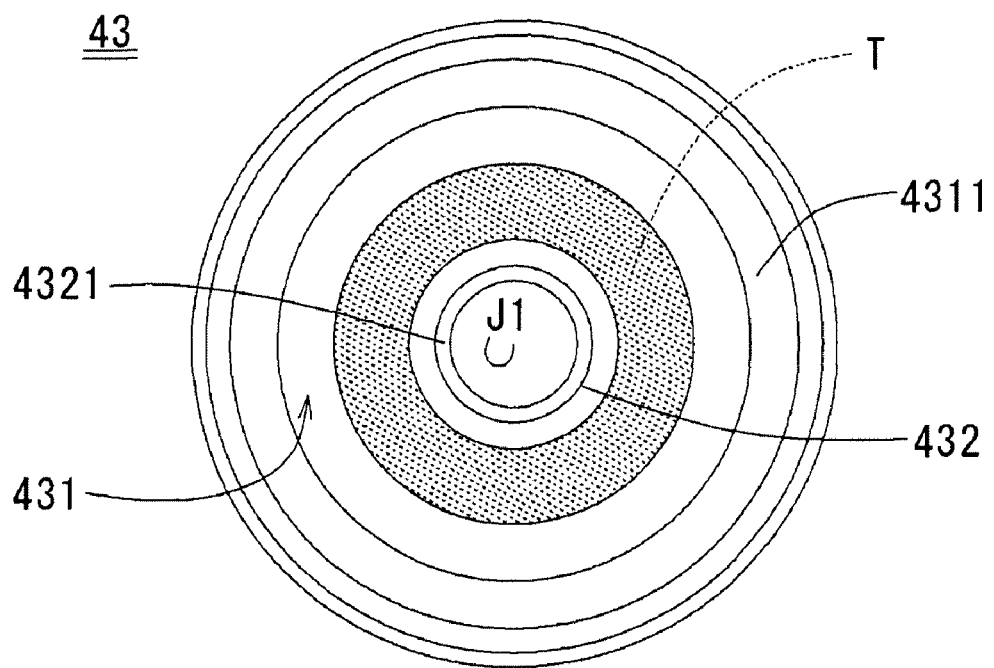
FIG. 7A is a top plan view showing a yoke that forms a part of the present chucking device and FIG. 7B is a an axially-cut schematic section view thereof.
Figure 7B:
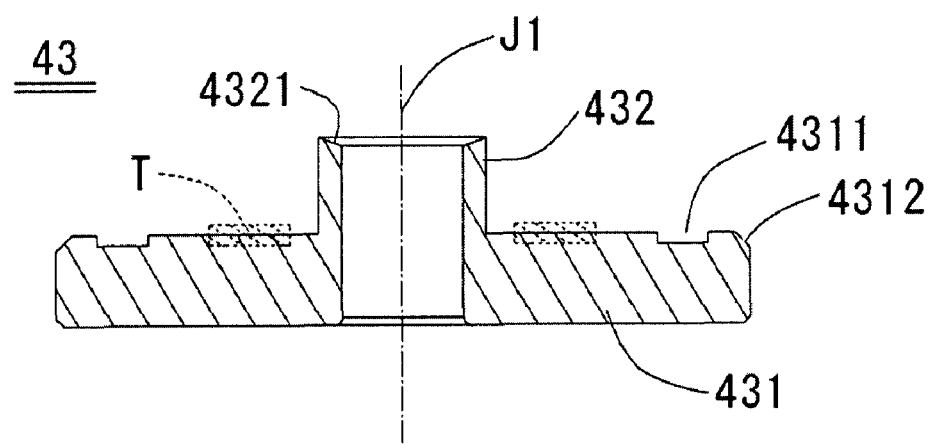

Referring to FIGS. 7A and 7B, the yoke 43 includes an annular plate portion 431 having an inner circumferential surface fixed to the outer circumferential surface of the shaft 21, the plate portion 431 being widened in a direction perpendicular to the center axis J1, and a cylinder portion 432 of generally cylindrical shape extending axially upwardly from an upper surface of the plate portion 431. The inner circumferential surface of the cylinder portion 432 has the same diameter as that of the inner circumferential surface of the plate portion 431.

An axially depressed annular recess portion 4311 is formed in the outer marginal region of the upper surface of the plate portion 431. A beveled surface 4312 inclined radially outwardly and axially downwardly is formed between the upper surface and the outer circumferential surface of the plate portion 431.

The upper surface of the cylinder portion 432 is formed of a slanting guide surface 4321 whose diameter is decreased in an axially downward direction.

Figure 8:
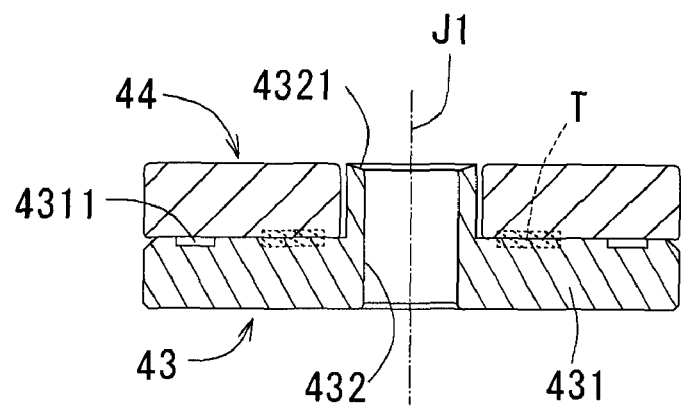
FIG. 8 is an axially-cut schematic section view depicting a state that a clamp magnet is mounted to the yoke forming a part of the present chucking device.

Referring to FIG. 8, the clamp magnet 44 is adhesively bonded to the upper surface of the plate portion 431 of the yoke 43. The inner circumferential surface of the clamp magnet 44 is radially spaced apart from the outer circumferential surface of the cylinder portion 432. The radial position of the outer circumferential surface of the clamp magnet 44 is substantially the same as the radial position of the outer circumferential surface of the plate portion 431. By attaching the clamp magnet 44 with reference to the outer diameter of the plate portion 431, it is possible to prevent the outer circumferential surface of the clamp magnet 44 from making contact with the inner circumferential surface of the peripheral wall portions 4213 of the cone 42 and the radially inner surface of the second deformation portion 4222b. This makes it possible to prevent occurrence of defects such as failure of axial downward movement of the disk holding portion 421, deformation of the disk holding portion 421 and the like, which would otherwise occur when the clamp magnet 44 comes into contact with the cone 42. As a result, it is possible to provide a highly reliable chucking device and a brushless motor equipped with the chucking device.

An adhesive agent is applied on a region T (a dot-line hatched region) of the upper surface of the plate portion 431 of the yoke 43 lying radially inwardly of the recess portion 4311. This ensures that, even if the adhesive agent is spread radially outwardly when attaching the clamp magnet 44 to the plate portion 431 of the yoke 43, the adhesive agent thus spread is received in the recess portion 4311. Therefore, it is possible to prevent the adhesive agent from being squeezed radially outwardly toward the outer circumferential surface of the plate portion 431 of the yoke 43.

A tapering groove is formed between the lower surface of the clamp magnet 44 and the beveled surface 4312 of the plate portion 431 of the yoke 43. Therefore, even if the adhesive agent is spread radially outwardly from the recess portion 4311, the adhesive agent can be accommodated in the tapering groove between the lower surface of the clamp magnet 44 and the beveled surface 4312 of the plate portion 431 of the yoke 43. This makes it possible to more reliably prevent the adhesive agent from being squeezed radially outwardly toward the outer circumferential surface of the plate portion 431 of the yoke 43. Therefore, the adhesive agent is cured between the yoke 43 and the clamp magnet 44, thus making it possible to prevent failure of axial downward movement of the disk holding portion 421. As a result, it is possible to provide a highly reliable chucking device and a brushless motor equipped with the chucking device.

Figure 9:
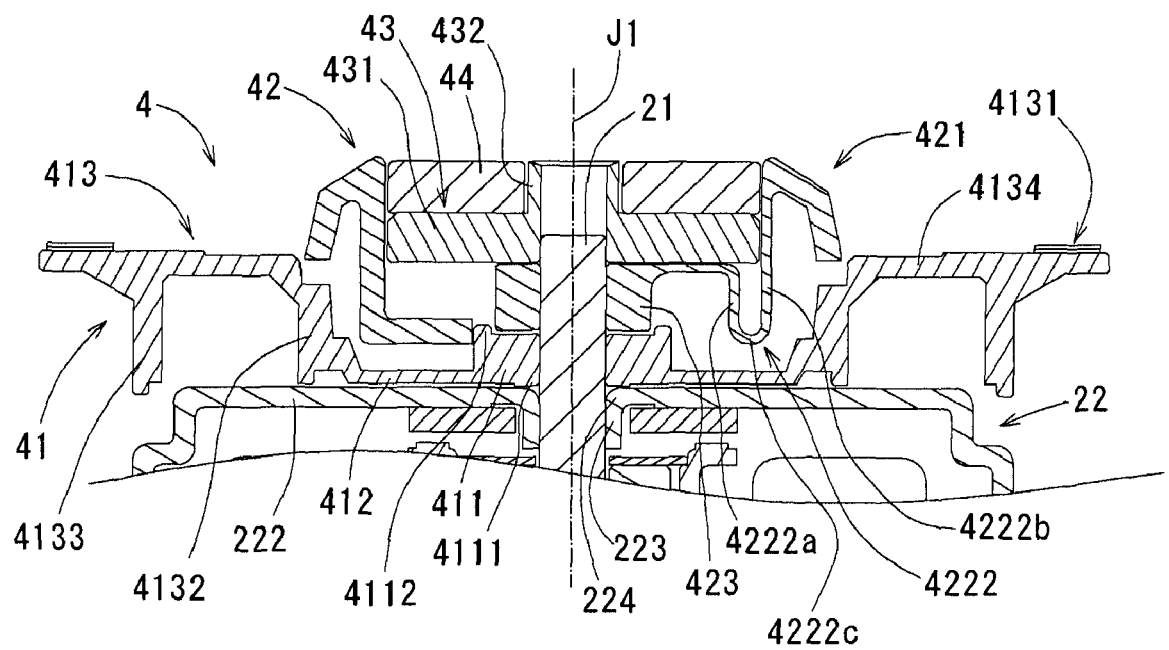
FIG. 9 is an enlarged view showing the chucking device of the brushless motor shown in FIG. 1 and its neighboring portions in an enlarged scale.

Referring to FIG. 9, the inner cylinder portion 223 of the rotor holder 22 is curved axially downwardly from the cover portion 222. Thus, a curved portion 224 is formed between the inner cylinder portion 223 and the cover portion 222.

An annular first protrusion 4111 protruding axially downwardly is formed in an inner marginal region on the lower surface of the cylinder portion 411 of the turntable 41. A plurality of arcuate second protrusions 4112 protruding axially upwardly is formed in an outer marginal region on the upper surface of the cylinder portion 411. The first protrusion 4111 has a lower surface that faces toward the upper surface of the curved portion 224 and the upper surface of the cover portion 222 in an axially spaced-apart relationship therewith. The second protrusions 4112 are annularly arranged to be circumferentially spaced apart with one another (see FIG. 6A).

Figure 6C:
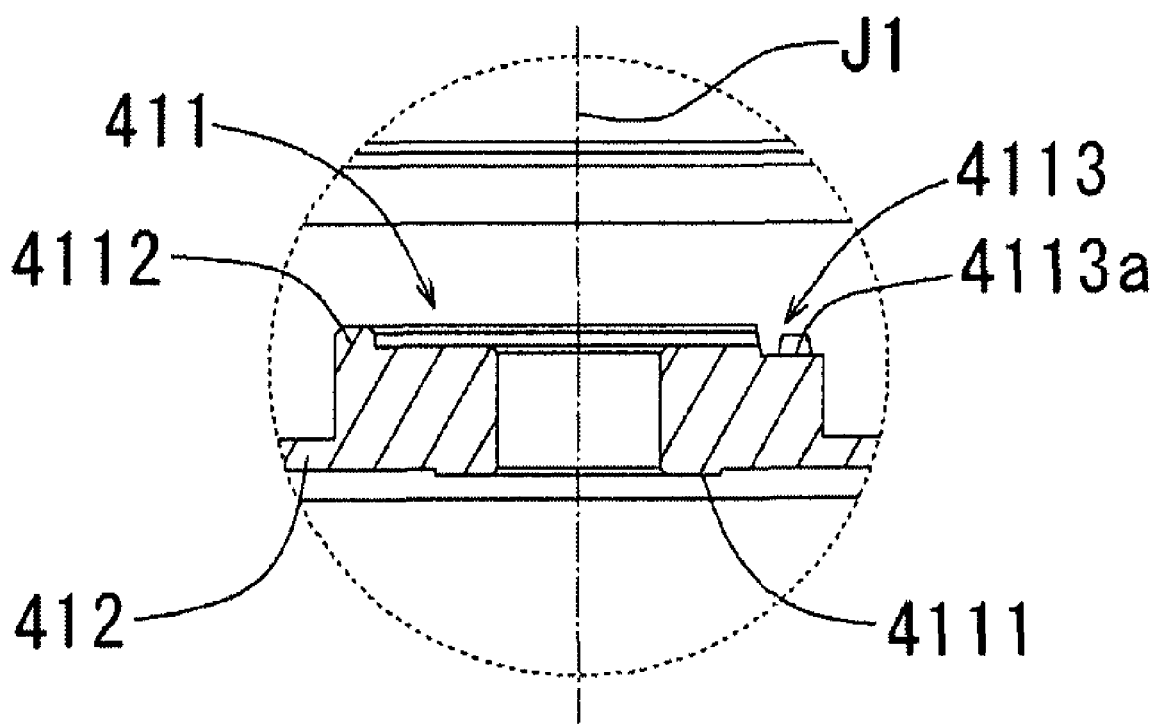
FIG. 6C is an enlarged view of the portion designated by a dot line circle in FIG. 6B.

Referring to FIGS. 6A through 6C, gate portions 4113 are provided in the circumferential gaps between the second protrusions 4112 circumferentially neighboring with one another. Each of the gate portions 4113 is formed in a depressed shape and has a surface formed axially below the inner peripheral upper surface of the cylinder portion 411. Each of the gate portions 4113 has an inner circumference provided radially inwardly of the outer circumferential surface of the shaft-fixed portion 423 of the cone 42. Each of the gate portions 4113 extends radially outwardly beyond the outer circumferential surface of the shaft-fixed portion 423.

Formed in each of the gate portions 4113 is an injection portion 4113a that axially faces toward an injection port (not shown) of a mold through which a resin material is injected into the mold. The injection portion 4113a is provided so that it can be arranged radially outwardly of the outer circumferential surface of the shaft-fixed portion 423. When the turntable 41 as a molded product is separated from the mold, the injection portion 4113a is formed into a protrusion by pulling the resin material in an axially upward direction in which the injection port of the mold is moved away from the injection portion 4113a. Since the injection portion 4113a is provided radially outwardly of the outer circumferential surface of the shaft-fixed portion 423, it is possible to keep the lower surface of the shaft-fixed portion 423 from making contact with the injection portion 4113a. This makes it possible to reduce the size of an axial gap between the lower surface of the shaft-fixed portion 423 and the upper surface of the cylinder portion 411 axially facing toward the shaft-fixed portion 423. As a result, it becomes possible to assure thickness reduction of the chucking device 4. Moreover, since the cylinder portion 411 is formed in the central region of the turntable 41, the flowability of a resin material can be improved by arranging the gate portions 4113 in the cylinder portion 411. This makes it possible to enhance the moldability of the turntable 41, while reducing occurrence of molding defects which would occur in the turntable 41.

The outer diameter of the shaft-fixed portion 423 of the cone 42 is smaller than the inner diameter of the second protrusions 4112. The axial position of the lower surface of the shaft-fixed portion 423 is axially below the axial position of the upper surfaces of the second protrusions 4112. The lower surface of the shaft-fixed portion 423 faces toward the upper surface of the cylinder portion 411 of the turntable 41 lying radially inwardly of the second protrusions 4112, with a radial gap left therebetween. Employment of the second protrusions 4112 makes it possible to secure an area over which the inner circumferential surface of the planar portions 4214 of the cone 42 makes sliding movement with the outer circumferential surface of the cylinder portion 411 of the turntable 41. Seeing that the outer diameter of the shaft-fixed portion 423 of the cone 42 is smaller than the inner diameter of the second protrusions 4112 and further that the lower surface of the shaft-fixed portion 423 is arranged axially below the upper surfaces of the second protrusions 4112, it is possible to assure thickness reduction of the chucking device 4. It is also possible to axially elongate the shaft-fixed portion 423, which increases the contact area between the inner circumferential surface of the shaft-fixed portion 423 and the outer circumferential surface of the shaft 21. This makes it possible to rigidly fix the cone 42 to the shaft 21.

For the purpose of their fixation to the shaft 21, the rotor holder 22 and the turntable 41 can be mounted with increased accuracy relative to the center axis J1. Furthermore, since the respective parts are arranged to be axially spaced apart with each other, it is possible to prevent deflection of the respective parts relative to the center axis J1, which would otherwise occur when the axially neighboring parts are in contact with each other. This makes it possible to mount the respective parts with increased accuracy relative to the center axis J1.

The elastically deformable portion 4222 is arranged radially outwardly of the cylinder portion 411 and is formed from the upper surface of the cylinder portion 411 to the axial lower side thereof. Since the radial extension portion 412 is joined to the lower end of the outer circumferential surface of the cylinder portion 411, it is possible to leave a sufficiently great axial gap between the lower end of the elastically deformable portion 4222 and the upper surface of the radial extension portion 412. This makes it possible to reduce the axial size of the chucking device 4 and also to secure great enough axial length of the first and second deformation portions 4222a and 4222b of the elastically deformable portion 4222. Since the axial length of the second deformation portion 4222b can be secured in this manner, it is possible to reduce the disk mounting force. Furthermore, there is provided a great enough radial gap between the first deformation portion 4222a of the elastically deformable portion 4222 and the cylinder portion 411 of the turntable 41. Therefore, even if the first deformation portion 4222a undergoes radially inward elastic deformation when the disk has been mounted to the chucking device 4, it is possible to avoid contact between the first deformation portion 4222a and the cylinder portion 411. Consequently, it is possible to axially downwardly move the disk holding portion 421 in a smooth manner, which in turn reduces the disk mounting force.

The lower surface of the plate portion 431 of the yoke 43 faces toward the upper surface of the shaft-fixed portion 423 and the upper surface of the support portion 4221 to be axially spaced apart with each other. Furthermore, the outer circumferential surface of the plate portion 431 of the yoke 43 and the outer circumferential surface of the clamp magnet 44 face toward the inner circumferential surface of the peripheral wall portions 4213 of the disk holding portion 421 and the radial inner surface of the second deformation portion 4222b of the arm portions 422 to be radially spaced apart with each other. Moreover, the upper end of the cylinder portion 432 of the yoke 43 extends axially upwardly beyond the upper end surface of the shaft 21.

For the purpose of their fixation to the shaft 21, the cone 42 and the yoke 43 can be mounted with increased accuracy relative to the center axis J1. Furthermore, since the respective parts are arranged to be axially spaced apart with each other, it is possible to prevent deflection of the respective parts relative to the center axis J1, which would otherwise occur when the axially neighboring parts are in contact with each other. This makes it possible to mount the respective parts with increased accuracy relative to the center axis J1.

(Structure of Disk Drive Apparatus)

Figure 10:
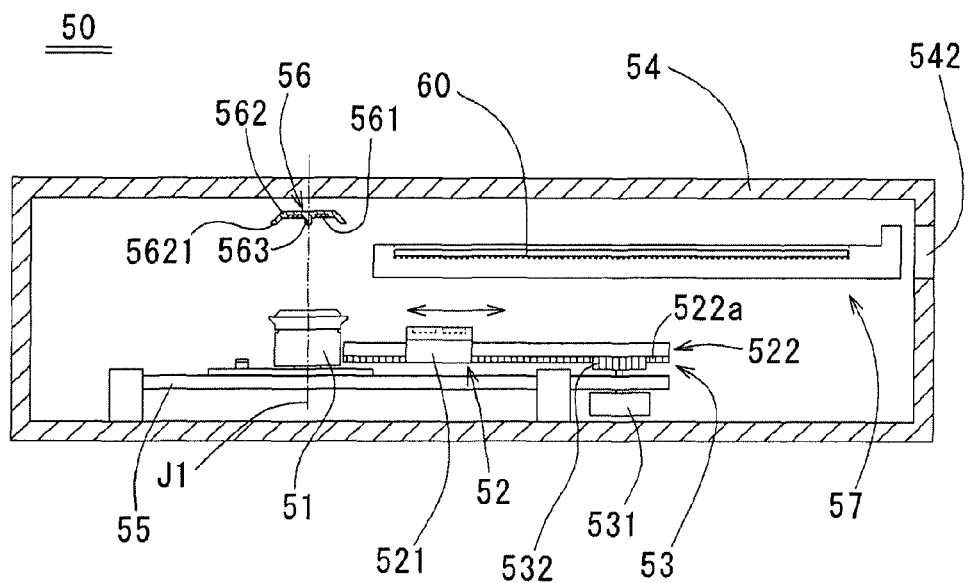
FIG. 10 is an axially-cut schematic section view showing one embodiment of a disk drive apparatus in accordance with the present invention.

Next, one embodiment of a disk drive apparatus equipped with the present motor will be described with reference to FIG. 10. FIG. 10 is an axially-cut schematic section view showing the present disk drive apparatus.

Referring to FIG. 10, the disk drive apparatus 50 includes a spindle motor 51 for rotating a disk 60 having a central opening 61, the spindle motor 51 designed to bring itself into coaxial alignment with the rotational axis of the disk 60 as it is inserted into the central opening 61 of the disk 60, an optical pickup mechanism 52 for recording and reproducing information on and from the disk 60 by irradiating a laser beam toward the disk 60, a moving mechanism 53 for moving the optical pickup mechanism 52 in a radial direction of the disk 60, and a housing 54 for receiving the spindle motor 51, the optical pickup mechanism 52 and the moving mechanism 53.

The spindle motor 51 and the optical pickup mechanism 52 are held in place by means of a chassis 55. As the chassis 55 is moved at least in an axial direction, the central opening 61 of the disk 60 is mounted to the chucking device of the spindle motor 51. The chassis 55 is provided with an aperture and the optical pickup mechanism 52 is arranged inside the aperture.

The moving mechanism 53 includes a motor 531 with a geared output shaft and a driving gear 532 for transferring the torque of the motor 531.

A gate hole 542 through which the disk 60 is inserted and taken out is formed in the housing 54. Also arranged within the housing 54 is a tray 57 that holds and transports the disk 60 to the spindle motor 51. The tray 57 is able to move outside the housing 54.

The optical pickup mechanism 52 includes a recording and reproducing unit 521 for irradiating a laser beam and a carriage unit 522 for carrying the recording and reproducing unit 521, the carriage unit 522 provided perpendicularly to the radial direction of the disk 60 along which the recording and reproducing unit 521 moves. The carriage unit 522 has a rack portion 522a that comes into meshing engagement with the driving gear 532. The recording and reproducing unit 521 is moved in the radial direction together with the carriage unit 522.

As the driving gear 532 attached to the motor 531 rotates in meshing engagement with the rack portion 522a of the carriage unit 522, the carriage unit 522 is moved in the turning radius direction. Such movement of the carriage unit 522 causes the recording and reproducing unit 521 to move in the radial direction.

By applying the present brushless motor 1 to the spindle motor 51 of the disk drive apparatus 50, it is possible to cost-effectively provide a disk drive apparatus capable of centering the disk 60 into alignment with the spindle motor 51 with increased accuracy.

(Operation of Chucking Device during Disk Mounting Process)

Figure 11:
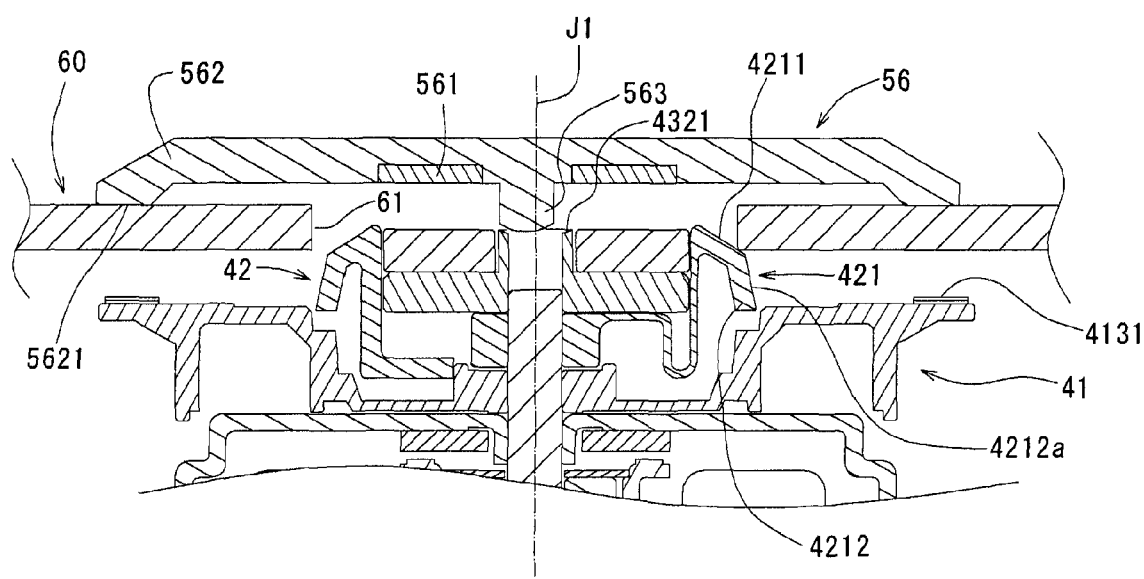
FIG. 11 is an axially-cut schematic section view depicting a state that a disk is being mounted to the present chucking device.
Figure 12:
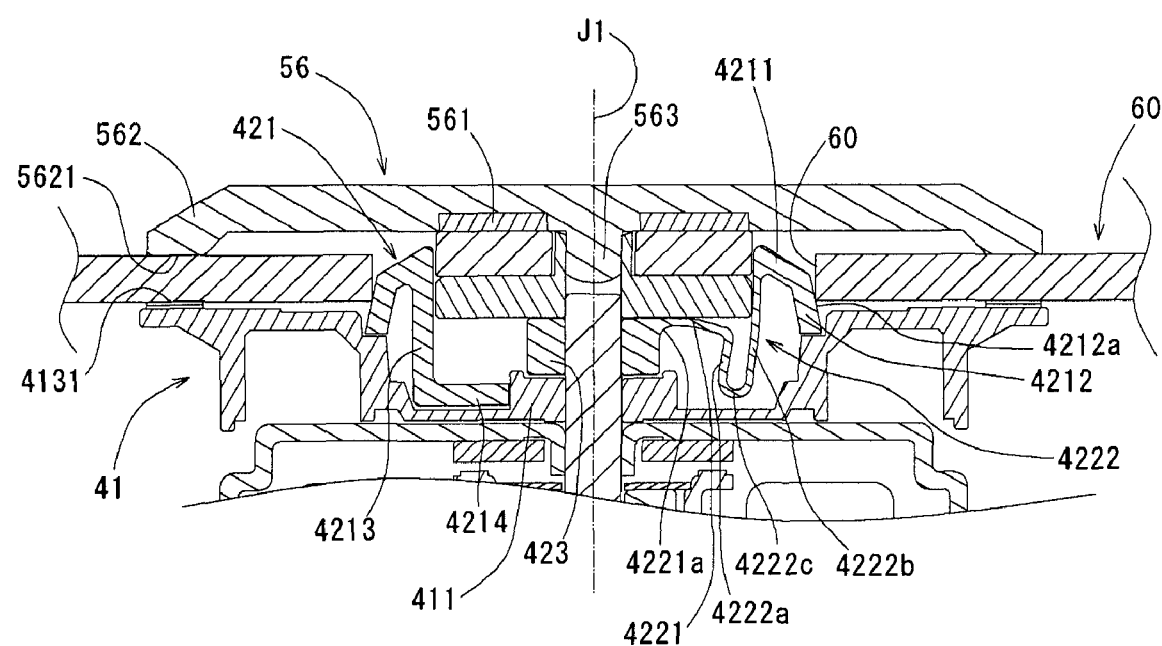
FIG. 12 is an axially-cut schematic section view depicting a state that the disk has been mounted to the present chucking device.

Next, the operation of the cone 42 during the process of mounting the disk 60 to the chucking device 4 will be described with reference to FIGS. 11 and 12. FIG. 11 is an axially-cut schematic section view depicting a state that the disk 60 begins to make contact with the chucking device 4. FIG. 12 is an axially-cut schematic section view depicting a state that the disk 60 has been mounted to the chucking device 4.

Referring to FIG. 11, a clamp member 56 is arranged on the upper surface of the disk 60. The clamp member 56 includes a magnetic clamp yoke 561 attractingly attached to the clamping magnet 44, a resin-made pressing portion 562 integrally formed with the clamp yoke 561 for pressing the upper surface of the disk 60 and a centering protrusion 563 integrally formed with the pressing portion 562, the centering protrusion 563 extending axially downwardly in a substantially coaxial relationship with the center axis J1. The pressing portion 562 has an annular disk contact surface 5621 that makes contact with the upper surface of the disk 60. The diameter of the disk contact surface 5621 is substantially the same as the diameter of the disk support portion 4131 of the turntable 41.

The central opening 61 of the disk 60 comes into contact with the first slanting portion 4211 of the cone 42. The central opening 61 of the disk 60 is guided toward the second slanting portion 4212 by the first slanting portion 4211. Thus, the center of the central opening 61 is substantially aligned with the center axis J1.

The centering protrusion 563 is inserted into the cylinder portion 432 under the guidance of the guide surface 4321 of the cylinder portion 432 of the yoke 43, thereby centering the centering protrusion 563 into alignment with the center axis J1. Since the centering protrusion 563 is satisfactorily guided into alignment with the center axis J1 by the guide surface 4321, it is possible to reduce the disk mounting force.

Referring to FIG. 12, the whole circumferential extension of the central opening 61 of the disk 60 makes contact with the disk holding surface 4212a of the second slanting portion 4212 when the lower surface of the disk 60 is brought into contact with the disk support portion 4131.

Referring again to FIG. 12, the support portion 4221 and the second deformation portion 4222b of the elastically deformable portion 4222 are heavily deformed in the arm portions 422. The support portion 4221 is elastically deformed in an axially downward direction, at which time the joining position of the support portion 4221 and the shaft-fixed portion 423 acts as a fulcrum point. The second deformation portion 4222b is radially inwardly deformed, at which time the joining position of the first slanting portion 4211 of the disk holding portion 421 and the second deformation portion 4222b acts as a fulcrum point. Responsive to the elastic deformation of the support portion 4221 and the second deformation portion 4222b, the first deformation portion 4222a and the third deformation portion 4222c are moved radially inwardly. Inasmuch as the support portion 4221 is joined to the upper end portion of the outer circumferential surface of the shaft-fixed portion 423, it is possible to increase the axial length of the first deformation portion 4222a and the second deformation portion 4222b. Thanks to the increase in the length of the second deformation portion 4222b, it becomes possible to deform the second deformation portion 4222b with a small force. Therefore, it is possible to axially downwardly move the disk holding portion 421 with ease by applying a small force to the disk holding portion 421 in an axially downward direction. As a result, it is possible to provide a chucking device operable with a reduced disk mounting force, a brushless motor provided with the chucking device and a disk drive apparatus equipped with the brushless motor.

Seeing that the curved surface portion 4221a is formed in the radially inward region of the lower surface of the support portion 4221, the portion serving as the fulcrum point of the support portion 4221 has an increased axial thickness and becomes a smoothly curved surface. This makes it possible to avoid concentration of a stress on the fulcrum point. Therefore, it is possible to reduce the axial thickness of the remaining portions of the support portion 4221. As a result, the support portion 4221 is axially downwardly movable with a small force, which ensures that the disk holding portion 421 can be moved axially downwardly even when a small force is applied thereto. This results in a decrease in the disk mounting force. In addition, it is possible to prevent the support portion 4221 from undergoing plastic deformation such as fracture or the like, even when the disk 60 is repeatedly mounted to and demounted from the chucking device 4 several times. Therefore, it is possible to provide a highly reliable chucking device.

When the disk 60 is mounted to the chucking device 4, the inner circumferential surfaces of the planar portions 4214 of the disk holding portion 421 make sliding movement with the outer circumferential surface of the cylinder portion 411 of the turntable 41 and move axially downwardly. Lubricant exists in the radial gap between the inner circumferential surfaces of the planar portions 4214 and the outer circumferential surface of the cylinder portion 411. This makes it possible to reduce the frictional force which would be generated when the planar portions 4214 are axially moved relative to the cylinder portion 411. As a consequence, it is possible to provide a chucking device that can reduce the disk mounting force, while highly accurately centering the disk into alignment with the center axis J1.

(Another Embodiment of Brushless Motor)

Figure 13:
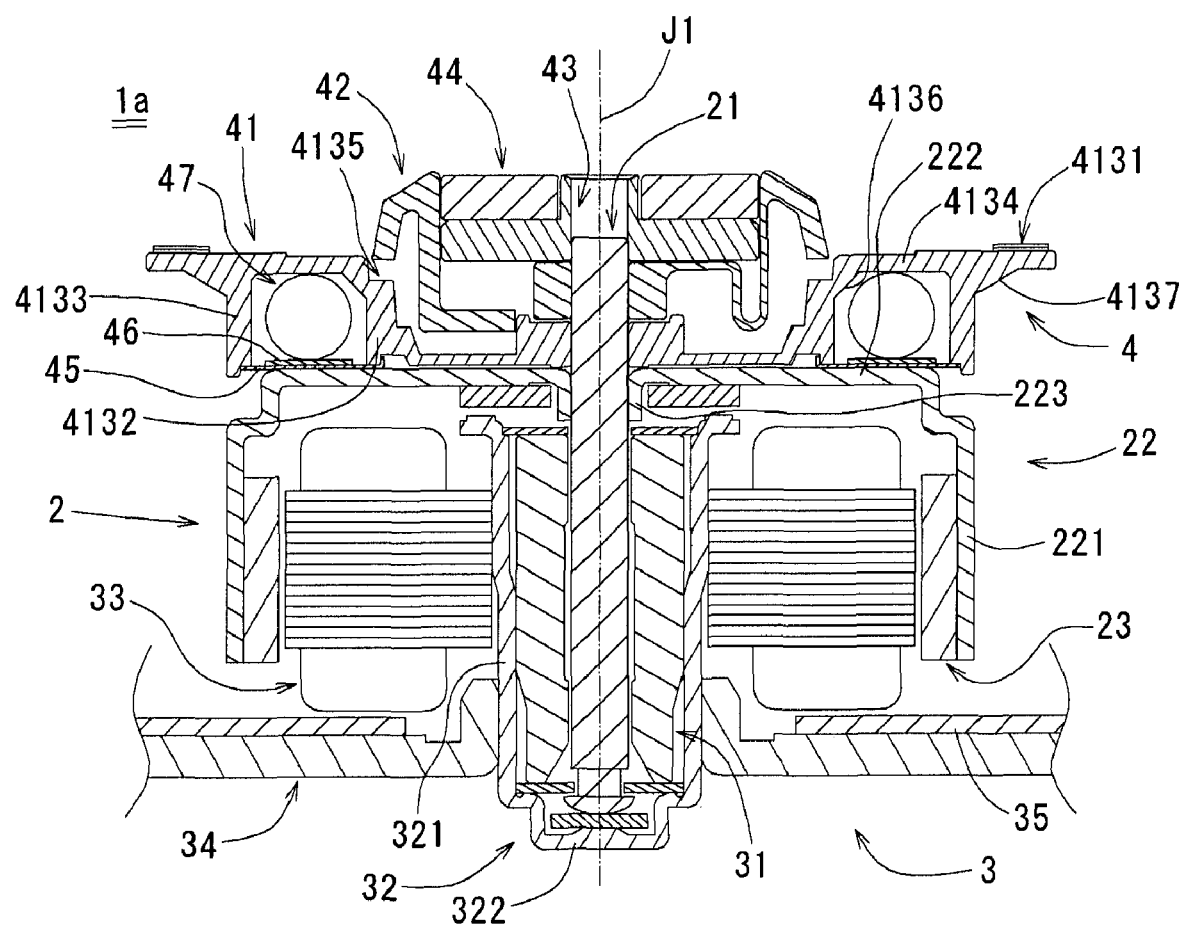
FIG. 13 is an axially-cut schematic section view showing another embodiment of a brushless motor in accordance with the present invention.

Next, another embodiment of the present brushless motor will be described with reference to FIG. 13, which is an axially-cut schematic section view showing another embodiment of the present brushless motor. In FIG. 13, the same members and portions as those shown in FIG. 1 are designated by like reference numerals. No description will be offered on the same members and portions as those shown in FIG. 1. Hereinafter, description will proceed regarding the portions modified from those shown in FIG. 1 and the portions not described in connection with FIG. 1.

Referring to FIG. 13, the disk support part 413 of the turntable 41 of the chucking device 4a includes a generally cylindrical inner circumferential wall portion 4132 joining to the radial extension portion 412 and extending in an axial direction, a generally cylindrical outer circumferential wall portion 4133 formed radially outwardly of the inner circumferential wall portion 4132 in a concentric relationship with the latter, and a generally annular connecting portion 4134 that radially interconnects the upper portions of the inner and outer circumferential wall portions 4132 and 4133.

An annular recess portion 4135 for receiving the axial lower end of the disk holding portion 421 of the cone 42 is defined by the upper surface of the inner circumferential wall portion 4132 and the inner circumferential surface of the connecting portion 4134. An annular slanting surface 4136 inclined radially inwardly and axially downwardly is formed between the outer circumferential surface of the inner circumferential wall portion 4132 and the lower surface of the connecting portion 4134. Despite formation of the annular recess portion 4135, the annular slanting surface 4136 helps eliminate the possibility that the cross-sectional area between the annular recess portion 4135 and the annular slanting surface 4136 grows extremely smaller than that of the remaining portions. This assists in improving the flowability of a resin material when injection-molding the turntable 41. As a result, it is possible to reduce occurrence of molding defects in the turntable 41.

The connecting portion 4134 extends radially outwardly of the outer circumferential wall portion 4133. A disk support portion 4131 is formed in the outer periphery region of the connecting portion 4134. The lower surface of the connecting portion 4134 lying radially inwardly of the outer circumferential wall portion 4133 is joined to the outer circumferential surface of the outer circumferential wall portion 4133 by a sloping surface 4137 inclined radially outwardly and axially upwardly.

A generally annular plate 45 made of a metal plate is fixed to the inner circumferential wall portion 4132 and the outer circumferential wall portion 4133 so that it can radially interconnect the lower ends of the inner and outer circumferential wall portions 4132 and 4133. The plate 45 includes a cylinder portion 451 fixed to the inner circumferential surface of the inner circumferential wall portion 4132 and a planar portion 452 extending radially outwardly from the cylinder portion 451 and remaining in contact with the lower surfaces of the inner and outer circumferential wall portions 4132 and 4133. A resin-made annular seat 46 is fixed to the radial extension region of the planar portion 452 between the inner circumferential wall portion 4132 and the outer circumferential wall portion 4133. A plurality of steel balls 47 for correcting the rotational balance of the rotating part 2 of the brushless motor 1 is arranged on the upper surface of the seat 46. This makes it possible to reduce vibration even when the brushless motor 1 is rotated at a high speed.

While certain embodiments of the present invention have been described hereinabove, the present invention is not limited thereto. Many changes or modifications may be made without departing from the scope of the claims.

As a specific example, although the sleeve 31 is used to rotatably support the shaft 21 in the present invention, the present invention is not limited thereto. It will suffice if the brushless motor is provided with a bearing mechanism for rotatably supporting the shaft 21. For that reason, the sleeve 31 may be replaced by, e.g., a ball bearing.

While the invention has been shown and described with respect to the embodiment, it will be understood by those skilled in the art that various changes and modifications may be made without departing from the scope of the invention as defined in the following claims.

What is claimed is:

1. A chucking device for removably holding a disk with a central opening, comprising:
    a shaft coaxially arranged with a specified center axis;
    a turntable fixed to the shaft, the turntable having a disk support surface for supporting the disk; and
    a resin-made cone arranged axially above the turntable, the cone including a shaft-fixed portion fixed to the shaft, a disk holding portion having an annular disk holding surface inclined radially outwardly and axially downwardly, and an arm portion for radially interconnecting the shaft-fixed portion and the disk holding portion,
    wherein the arm portion includes a support portion extending radially outwardly from the shaft-fixed portion and an elastically deformable portion joined to the support portion for being elastically deformed to axially downwardly move the disk holding portion as the disk comes into contact with the disk holding portion.

2. The chucking device of claim 1, wherein the disk holding portion includes an arcuate peripheral wall portion substantially parallel to the center axis and an arcuate planar portion extending radially inwardly from a lower end of the peripheral wall portion, the peripheral wall portion and the planar portion being in a position circumferentially deviated from the arm portion, and wherein the turntable includes an inner wall portion having an outer circumferential surface radially facing toward an inner circumferential surface of the planar portion, the inner circumferential surface of the planar portion being slidingly movable with respect to the outer circumferential surface of the inner wall portion.

3. The chucking device of claim 2, wherein the inner circumferential surface of the planar portion has surface roughness smaller than that of the remaining portions of the cone.

4. The chucking device of claim 2, wherein a cone gate portion serving as a resin injection port during an injection molding process is arranged on an upper surface or a lower surface of the planar portion.

5. The chucking device of claim 4, wherein the turntable is formed of injection-molded resin material,
    wherein the turntable includes a cylinder portion having an inner circumferential surface fixed to the shaft, the cylinder portion including the inner wall portion, and a radial extension portion of annular plane shape extended from a lower end of the inner wall portion to axially face the planar portion of the cone, and
    wherein a turntable gate portion serving as an injection port of the resin material during the injection molding process is arranged on an upper surface of the cylinder portion.

6. The chucking device of claim 5, wherein a protrusion forming a part of the inner wall portion and having an upper surface positioned axially above a radially inner surface region of the cylinder portion is formed on an outer peripheral region of the cylinder portion,
    wherein the protrusion includes a plurality of protrusions arranged to be circumferentially spaced apart with one another, and
    wherein the turntable gate portion is provided between the protrusions neighboring in a circumferential direction.

7. The chucking device of claim 6, wherein the turntable gate portion is formed to extend radially outwardly beyond the outer circumferential surface of the shaft-fixed portion of the cone, and wherein the turntable gate portion has an injection portion corresponding to a resin injection port of a mold, the injection portion being positioned radially outwardly of the shaft-fixed portion of the cone.

8. The chucking device of claim 2, wherein a rib for interconnecting the outer circumferential surface of the peripheral wall portion and the disk holding surface is formed between the outer circumferential surface of the peripheral wall portion and the disk holding surface.

9. The chucking device of claim 8, wherein the rib includes a plurality of ribs formed on the outer circumferential surface of the peripheral wall portion to be circumferentially spaced apart with one another.

10. The chucking device of claim 2, wherein the inner wall portion of the turntable is formed in a cylindrical shape and has an inner circumferential surface fixed to the shaft.

11. The chucking device of claim 10, further comprising:
    a yoke made of a magnetic body and arranged axially above the shaft-fixed portion of the cone, the yoke including a cylinder portion with an inner circumferential surface fixed to the shaft, and a generally annular planar portion extending radially outwardly from the cylinder portion, wherein the shaft-fixed portion of the cone is arranged axially above the inner wall portion of the turntable, and wherein a gap is formed between an upper surface of the inner wall portion and a lower surface of the shaft-fixed portion, a gap being formed between an upper surface of the shaft-fixed portion and a lower surface of the cylinder portion of the yoke.

12. The chucking device of claim 11, wherein the inner wall portion of the turntable has an outer diameter greater than that of the shaft-fixed portion of the cone and wherein a protrusion extending axially above the lower surface of the shaft-fixed portion is formed in an upper surface region of the inner wall portion lying radially outwardly of the shaft-fixed portion, an outer peripheral surface of the protrusion is formed as a part of the outer circumferential surface of the inner wall portion.

13. The chucking device of claim 11, wherein the support portion extends radially outwardly from the upper end of the outer circumferential surface of the shaft-fixed portion, wherein the support portion has an upper surface whose axial height is substantially the same as that of the upper surface of the shaft-fixed portion, and wherein a curved surface portion is formed on a lower surface of the support portion in such a manner as to increase the axial thickness of the support portion in a radially inward direction.

14. The chucking device of claim 11, wherein the elastically deformable portion is formed radially outwardly of the outer circumferential surface of the inner wall portion and has a portion lying axially below the upper surface of the inner wall portion.

15. The chucking device of claim 1, wherein the arm portion is thinner than the remaining portions of the cone.

16. The chucking device of claim 1, wherein the elastically deformable portion includes:

a first deformation portion extending axially downwardly from the support portion;

a second deformation portion extending substantially parallel to the first deformation portion and joining to the disk holding portion; and a third deformation portion for interconnecting the first deformation portion and the second deformation portion.

17. The chucking device of claim 16, wherein the first deformation portion is thicker than the second deformation portion.

18. The chucking device of claim 16, wherein the second deformation portion has an outer surface joined to the disk holding portion in a position axially above the position where the disk holding portion is joined to an outer circumferential surface of a peripheral wall portion.

19. The chucking device of claim 16, wherein a radial distance between the center axis and the inner surface of the second deformation portion is substantially the same as the radial distance between the center axis and the inner circumferential surface of the peripheral wall portion, and wherein a radial distance between the center axis and the outer surface of the second deformation portion is smaller than the radial distance between the center axis and the outer circumferential surface of the peripheral wall portion.

20. The chucking device of claim 1, wherein the support portion extends radially outwardly from an upper end of an outer circumferential surface of the shaft-fixed portion.

21. A brushless motor provided with a chucking device for removably holding a disk with a central opening, wherein the chucking device comprises:

a shaft coaxially arranged with a specified center axis;

a turntable fixed to the shaft, the turntable having a disk support surface for supporting the disk; and a resin-made cone arranged axially above the turntable, the cone including a shaft-fixed portion fixed to the shaft, a disk holding portion having an annular disk holding surface inclined radially outwardly and axially downwardly, and an arm portion for radially interconnecting the shaft-fixed portion and the disk holding portion, wherein the arm portion includes a support portion extending radially outwardly from the shaft-fixed portion and an elastically deformable portion joined to the support portion for being elastically deformed to axially downwardly move the disk holding portion as the disk comes into contact with the disk holding portion, wherein the brushless motor comprises:

a rotating part having a rotor magnet rotatable about the center axis together with the shaft; and a fixed part having a stator facing toward the rotor magnet for generating magnetic fields.

22. A disk drive apparatus equipped with a brushless motor provided with a chucking device for removably holding a disk with a central opening, wherein the chucking device comprises:

a shaft coaxially arranged with a specified center axis;

a turntable fixed to the shaft, the turntable having a disk support surface for supporting the disk; and a resin-made cone arranged axially above the turntable, the cone including a shaft-fixed portion fixed to the shaft, a disk holding portion having an annular disk holding surface inclined radially outwardly and axially downwardly, and an arm portion for radially interconnecting the shaft-fixed portion and the disk holding portion, wherein the arm portion includes a support portion extending radially outwardly from the shaft-fixed portion and an elastically deformable portion joined to the support portion for being elastically deformed to axially downwardly move the disk holding portion as the disk comes into contact with the disk holding portion, wherein the brushless motor comprises:

a rotating part having a rotor magnet rotatable about the center axis together with the shaft; and a fixed part having a stator facing toward the rotor magnet for generating magnetic fields, wherein the disk drive apparatus comprises:

an optical pickup mechanism having a recording and reproducing unit for performing at least one of optical recording and reproducing tasks for the disk; and a moving mechanism for moving the optical pickup mechanism in a radial direction of the disk.

* * * * *